Figure 5:
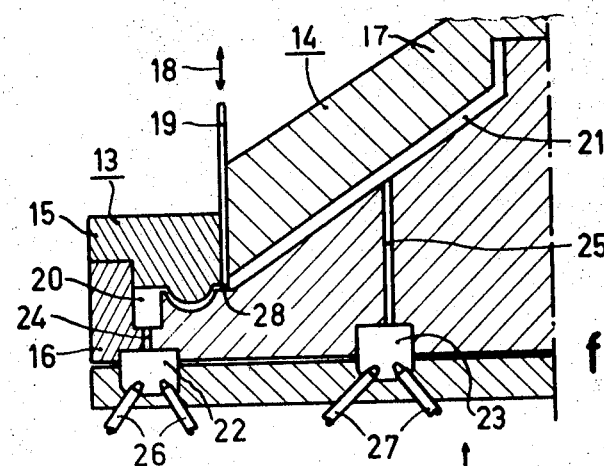

United States Patent

[11] 3,612,783

| | | |
|---|---|---|
| [72] | Inventor | Kuno Schneider<br>Vienna, Austria |
| [21] | Appl. No. | 741,411 |
| [22] | Filed | July 1, 1968 |
| [45] | Patented | Oct. 12, 1971 |
| [73] | Assignee | U.S. Philips Corporation<br>New York, N.Y. |
| [32] | Priority | July 5, 1967 |
| [33] | | Austria |
| [31] | | A 6244/67 |

[54] FOAM DIAPHRAGM FOR LOUDSPEAKER
5 Claims, 7 Drawing Figs.

[52] U.S. Cl. .................................................. 179/181 F,
181/31
[51] Int. Cl. ..................................................... H04r 7/06
[50] Field of Search ........................................... 179/115.5,
181; 181/32

[56] References Cited
UNITED STATES PATENTS

| | | | |
|---|---|---|---|
| 3,046,362 | 7/1962 | White .......................... | 179/115.5 |
| 2,596,645 | 5/1952 | Brennan ....................... | 181/32 |
| 3,073,916 | 1/1963 | Williams et al. .............. | 179/181 |
| 3,172,498 | 3/1965 | Gorike ......................... | 181/32 |

*Primary Examiner*—Kathleen H. Claffy
*Assistant Examiner*—Thomas L. Kundert
*Attorney*—Frank R. Trifari

ABSTRACT: An acoustic converter formed as a foam membrane with its neck, cone, centering ring, and peripheral zone sectors made of different foam constituents with different mechanical and acoustical properties.

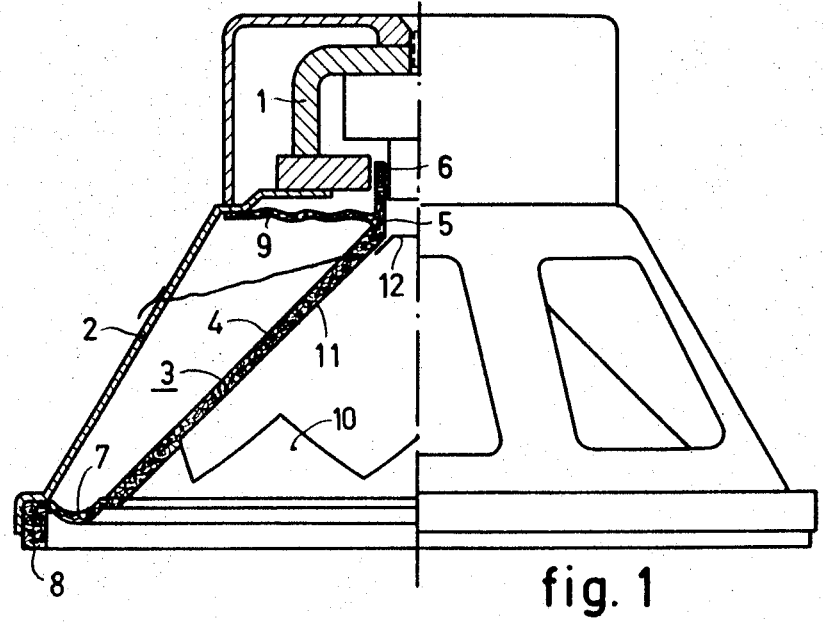
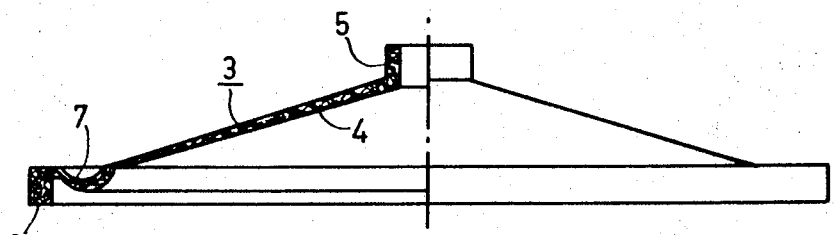
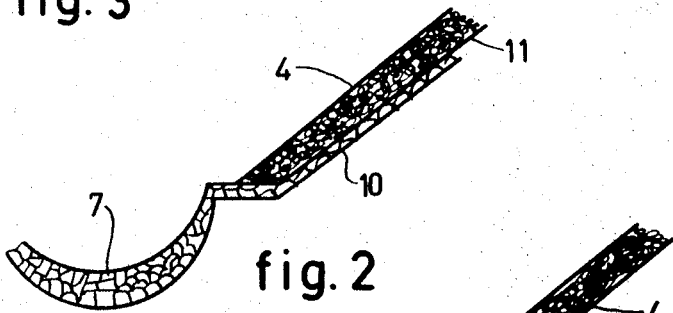
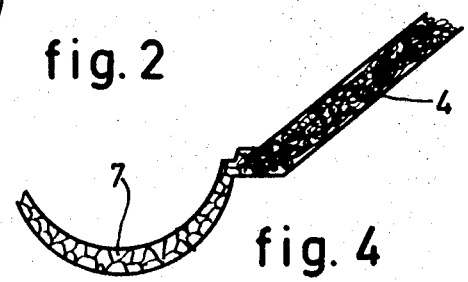

INVENTOR.
KUNO SCHNEIDER
BY
AGENT

FOAM DIAPHRAGM FOR LOUDSPEAKER

The invention relates to an acoustic converter comprising a foam membrane of an arbitrary shape consisting of a plurality of sectors such as coil neck, membrane cone, peripheral zone, supporting part and the like. In such known acoustic converters the whole foam membrane is made from a foam of a single composition, while the separate sectors are subsequently treated to vary their acoustic or mechanical properties. For example, the membrane formed by a single moulded body is subjected afterwards to compression in the zone of the peripheral groove and, as the case may be, of the coil neck. In this way the structure of the foam and hence within certain limits the properties thereof are modified at the subsequently worked places.

The invention has for its object to provide an acoustic converter in which the properties of the separate sectors of the foam membrane can be chosen at will within very wide limits, and is characterized in that in order to obtain different acoustic and mechanical properties some of the sectors are made of foam substances of different composition. With a foam it impossible to vary the properties simply by varying the constituents which are mixed to obtain the foam substance, which will be described in detail hereinafter. In this way acoustic converters for quite different requirements especially of very high quality can be simple manufactured. It is advantageous to embed parts cooperating with the foam membrane such as the moving coil, the centering ring and the like directly in the foam substance.

The invention relates further more to methods of manufacturing foam membranes for acoustic converters of the kind set forth. If sharply defined transitions between the membrane sectors are desired, it is advantageous to manufacture the separate sectors of the membrane to be made of differently composed foam constituents by means of multipartite mould, each part of which consists of two halves, while for each sector an individual mould compartment is provided which can be closed against the mould compartments for the other sectors and into which the foam substance is introduced through at least one inlet; two adjacent sectors are made one after the other by closing one mould compartment against the other, by introducing the foam substance into the former, removing subsequently the closure and introducing the foam substance of the different composition into the latter, while at the boundary of the sectors the foam substances establish a connection with each other. In the case of three or more adjacent sectors it is efficient to close the mould compartment of the third sector located between the two other compartments against said two adjacent compartments, while the foam substance is introduced simultaneously into these compartments of the sectors adjacent said third sector.

If on the contrary it is desired to obtain an uninterrupted transition between the membrane sectors it is advantageous to manufacture the separate sectors to be made of foam substances of differently composed constituents by means of a bipartite mould, the mould compartments of at least two adjacent sectors communicating directly with each other and each compartment having at least one inlet for the foam substance, while the foam substances are simultaneously introduced into said adjacent compartments and the rate of expansion in each mould compartment is chosen so that the foam substances meet at the interface of the sectors and establish a connection with each other, and may partially mix with each other.

The invention furthermore relates to moulds for the manufacture of such foam membranes by said method. With two adjacent sectors it is advantageous to have at least one half of a mould compartment arranged so as to be displaceable up to the other half, while the two halves of a closed mould compartment are completely in contact with each other at least at the partition to the mould compartment of the neighboring sector. It has been found to be very efficient to provide adjustable slides between the mould compartments of two adjacent sectors, which slides separate the sectors from each other in their operational positions.

Figure 6:
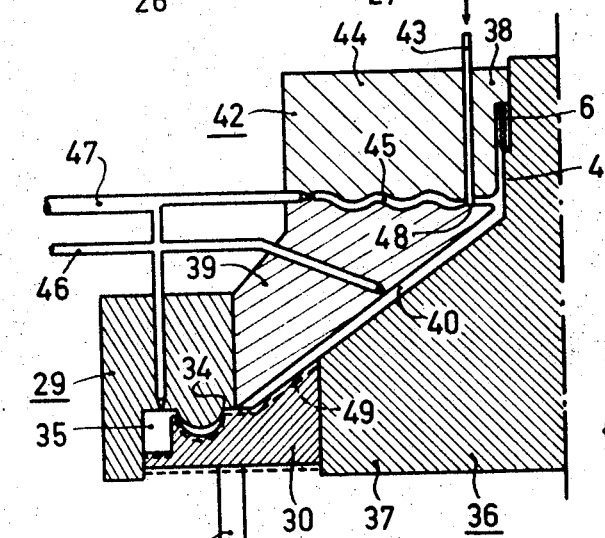
Figure 7:
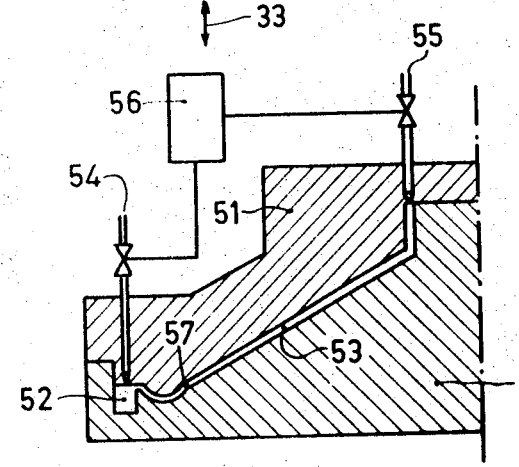

The invention will now be described with reference to the drawing, which shows a few embodiments to which the invention is however, not restricted. FIG. 1 is a partial sectional view of an acoustic converter according to the invention i.e. a loudspeaker and FIG. 2 shows on an enlarged scale the boundary between the membrane cone and the peripheral zone FIG. 3 is a partial sectional view of only a foam membrane and FIG. 4 shows again on an enlarged scale the boundary between the membrane cone and the peripheral zone. FIGS. 5 to 7 illustrate the method according to the invention and different moulds for the manufacture of the foam membranes.

FIG. 1 shows a loudspeaker having a magnet system 1, connected with the loudspeaker frame 2. The membrane 3 is made of foam substance and comprises a membrane neck 5, adjacent the membrane cone 4, in which the moving coil 6 is directly embedded. The membrane is suspended by means of a peripheral zone 7, connected with the membrane cone and fixed by a supporting part 8 to the loudspeaker frame 2. The moving coil 6 is centered in the magnet system 1 by means of a centering ring 9 of foam substance, connected with the membrane 3 and fixed to the loudspeaker frame 2.

The separate sectors 4, 5, 7, 8 and 9 of the membrane, which together form the membrane structure, are all made of a foam substance. According to the invention some of these sectors are made of foam substances of differently composed constituents. Such a foam substance may consist of polyurethane, a reaction product of di- or tri-isocyanates and polyhydroxyl-compounds, briefly termed polyoes. Since the properties are determined by two semiraw-material constituents, each of which is variable and thus involves other features of the final product, many intermediate forms between hard and soft can be adjusted. The foam structure is obtained by driving agents which are operative during the reaction of the two basic constituents. Suitable isocyanate compounds are, for example, toluylene diisocyanate for the manufacture of soft polyurethane foams, diphenylmethane diisocyanate for the manufacture of hard polyurethane foams.

With the polyols the structure and the number of the free hydroxyl-groups are determinative of the properties of the final product. Strongly ramified polyesters yield hard foams, linear or slightly ramified polyesters or polyether yield soft foams. Polyester yield furthermore foams having a higher tensile strength and breaking strength, but having a lower elasticity than foams on polyether basis. A great number of hydroxyl-groups in the basic material provides hard final products and a smaller number of hydroxyl-groups in the basic material provides soft final products.

The driving agents are formed by carbon dioxide or hydrohalides, particularly monofluorotrichloromethane. During the foam producing process carbon dioxide is developed as a reaction product of isocyanate and water. If monofluorotrichloromethane, a low boiling point fluid, is added to the reaction mixture, it evaporates due to the reaction heat and thus forms the foam structure.

By adding catalysts, accelerators, emulsifiers, foam stabilizers and the like the evolution of the reaction and some properties of the final product can be controlled.

From the foregoing it will be obvious that multiple possibilities are given to modify the properties of a foam by differentiating the composition of the constituents. The invention is based on this recognition and according thereto the membrane cone 4 and the membrane neck 5 are made of a hard, rigid foam nd the peripheral zone 7, the supporting part 8 and the centering ring 9 are made of a soft, elastic foam. The specific pore size of the foam and the number of pores of the material determine the bulk, the rigidity and the damping properties of the membrane. In this way the rigid membrane neck provides a satisfactory coupling between the moving coil and the membrane cone and the rigidity of the membrane cone itself provides a satisfactory irradiation of sound and at the same time an elastic suspension across the peripheral zone and the centering ring of elastic foam. Yet the acoustic properties such as the characteristic curve, partial resonances, damping of such a sound converter can be determined simply by the choice of the composition of the constituents of the foam for the separate sectors of the membrane.

FIG. 2 shows diagrammatically for explaining the above embodiments the boundary between the membrane cone and the peripheral zone 7, where the different size and density of the pores indicate the various properties of the foam i.e. the rigidity of the membrane cone 4 and the elasticity of the peripheral zone 7. From FIGS. 2 and 1 it will be apparent that the peripheral zone 7 extends by a part 10 partially across the inner face 11 of the membrane cone 4 preferably in a triangular shape, which provides a particularly effective damping of the membrane.

As is shown in FIG. 1 the membrane may be provided with a dust hood 12. The peripheral zone 7 may, of course be shaped in a different form or a centering ring of textile material may be provided, the inner edge of which, like the moving coil, may be directly embedded in the foam of the membrane neck. The supporting part may be made as a particular sector from a foam of a different composition.

FIG. 3 shows a membrane which is provided subsequent to its manufacture with the moving coil and the centering ring by adhesion. In contrast to the membrane in the embodiment shown in FIG. 1, which has a sharply defined supporting part of the foam composition of the peripheral zone to the membrane cone, a continuous transition of the foam of the composition of the peripheral zone 7 to the foam of the other composition of the membrane cone 4 is provided in this membrane as is shown in FIG. 4. This provides a very satisfactory damping of the membrane.

With reference to FIG. 5 the manufacture of a foam membrane according to the invention comprising two sectors of differently composed foams i.e. the membrane cone 4 with the membrane neck 5 and the peripheral zone 7 within the supporting part 8 will be explained. Each sector 4, 5 and 7, 8 of the membrane is associated with a rotation-symmetrical mould compartment 13 and 14 respectively consisting of two halves 15, 16 and 17, 16 respectively; the half 16 is common to the two mould compartments. Each half may consist of several portions Between the halves 15 and 17 a slide 19 is movable in the direction of the arrow 18 for closing the moulding space 20 against the moulding space 21 of the two sectors. The half 16 comprises two chambers 22, 23, each of which is associated with one sector. One or more inlet ducts 24, 25 lead from these chambers to the corresponding moulding compartments 20 and 21 respectively. In each chamber open out two nozzles 26 and 27 respectively, which communicate with ducts through which the constituents of the foam are supplied to the chambers.

The process is such that, when the slide is closed, for example first the constituents of the foam of the parts 4, 5 and injected into the chamber 23 through the nozzles 27. These constituents mix up on the space 23 so that the foam is formed, which penetrates due to the resultant pressure or by means of additional compression agents through the duct(s) into the moulding space 21, which is thus filled. After curing of the foam, the slide 19 is lifted so that the connection with the space 20 is established. The constituents of the foam for the parts 7, 8 are then injected through the nozzles 26 into the chamber 22, in which the foam is formed, which penetrates through the duct(s) 24 into the moulding space 20, which is thus filled. The foam reaches the boundary 28 of the foam of the other sector, with which it forms a connection so that a coherent body is formed. The mould halves can then be separated and the membrane can be taken out. After the foam parts formed by the inlet ducts 24, 25 have been removed from the membrane, the latter is ready.

Advantageous properties of such a membrane have been obtained, for example, by using the constituents "Desmophen TMLA/1" and "LK1417" and "Desmodur V44" commercially available from the firm of Bayer, Leverkusen. For the sector 4, t a rigid foam was made by a composition of the constituents "Desmophen TMLA/1" and "Desmodur V44" in a ratio of 1:1 and for the sector 7, 8 an elastic foam was made by a composition of the constituents "Desmophen LK1417" and "Desmodur V44" in a ratio of 3:1. Obviously foams may be employed which are composed from more than two constituents; in general the composition of the constituents may be chosen completely in accordance with the desired properties.

For the manufacture of a membrane for the acoustic converter shown in FIG. 1 a mould as shown in FIG. 6 is used. This mould comprises a compartment 29 for the sector 7, 8 one half 30 of which is adapted to be displaced with respect to the other half by means of a slide 32 in the direction of the arrow 33. When the two halves are shifted against each other, they are completely in contact with each other at 34 and thus form a closure for the moulding space 35 of this sector. The mould compartment 36 for the sector 4, 5 comprises one half 37 and a half formed by the portion 38 and the multipartite portion 39. For this sector a moulding compartment 40 is formed, the upper portion 41 of which can accommodate the moving coil 6. A third mould compartment 42 is separated by the slide 43 from the compartment 38 and comprises the half 44 and the half 39 of the mould compartment 36, a moulding space 45 being thus formed, which corresponds with the sector 9 for the centering ring. In each moulding space opens out at least one inlet duct for the foam, i.e. a duct 46 for the space 40 and a common duct 47 for the spaces 35 and 45, since these two parts are preferably made of foams of the same composition.

First the slide 43 and the boundary area 34 are closed. Foam is injected through the feeding duct 46 into the moulding space 40. After curing of said foam the slide 43 is lifted and the half 30 is lowered over a predetermined distance so that the boundary areas 48 and 34 are opened so that simultaneously a moulding space 49 is formed for the parts 10 as is indicated by broken lines. By injecting foam through the duct 47 the sectors 7, 8 10 and 9 of the membrane are then formed and at the boundary areas the connection is established with the sector 4, 5.

For the manufacture of a membrane as shown in FIG. 3 a mould as shown in FIG. 7 is employed. This mould comprises two halves 50 and 51, while the two moulding spaces 52 and 53 of the two sectors 4, 5 and 7, 8 directly merge in each other. Each moulding space has, however, its own feeding duct 54 and 55 respectively for the foam of the respective composition of the sector concerned. There is provided a control-member 56 (shown diagrammatically) for controlling the rate of expansion of the foam in the two moulding spaces, for example, by controlling the quantities to be fed.

The foams of the respective compositions are injected at least approximately at the same time through the two ducts 54 and 55 into the mould and the rates of expansion are chosen so that the two foams meet exactly at the desired boundary area 56 of the two adjacent sectors, where they form connection with each other and may even mix partly. In this way the foams of the two compositions merge continuously in each other since they have not yet hardened, so that a sharp boundary is avoided, which is advantageous for the acoustic properties of such a membrane. The damping of the membrane may also be modified by the degree of penetration of the foam of the sector 7, 8 into the sector 4, 5 and the degree of mixing of the foams.

Obviously, the embodiments described above may be modified within wide limits within the scope of the invention particularly with respect to the choice of the foams, the manufacture of the foams, the injection into the mould, the shape of the membrane itself and the like. It is further advantageous to manufacture acoustic converters to be used as microphones by using the invention.

I claim:

1. An acoustic converter comprising a plurality of sectors such as the neck, the cone, peripheral zone, and supporting part, the different sectors composed selectively of different foam constituents with different acoustic and mechanical properties, the interface between at least one pair of adjacent sectors of different foams being a generally continuous transition with said pair of different foams being partially mixed at said interface.

2. An acoustic converter according to claim 1 and operative with speaker parts such s a moving coil and a centering ring, wherein at least one of said parts is directly embedded in the foam.

3. A device according to claim 1 wherein the foam is a reaction product of di- or tri-isocyanates and polyhydroxyl compounds, with selected ratios of these compounds in said different sectors.

4. A device according to claim 1 further comprising a centering ring sector, and wherein the neck and cone sectors are relatively rigid, and the centering ring, peripheral zone, and supporting part are relatively elastic.

5. A device according to claim 1 wherein the foams of the different sectors varies in regard to the size and density of pores.

UNITED STATES PATENT OFFICE
CERTIFICATE OF CORRECTION

Patent No. 3,612,783        Dated October 12, 1971

Inventor(s) KUNO SCHNEIDER

It is certified that error appears in the above-identified patent and that said Letters Patent are hereby corrected as shown below:

Col. 1, line 22, "it impossible" should be --it is possible--;

line 30, "further more" should be --furthermore--;

Col. 2, line 64, "nd" should be --and--;

Col. 3, line 24, "supporting part" should be --transition--;

line 40, after "portions" insert -- . --;

line 55, after "duct(s)" insert --25--;

line 73, "4, t" should be --4,5--;

Col. 4, line 53, "56" should be --57--.

Signed and sealed this 2nd day of January 1973.

(SEAL)
Attest:

EDWARD M. FLETCHER, JR.
Attesting Officer

ROBERT GOTTSCHALK
Commissioner of Patents